United States Patent [19]

Reast

[11] Patent Number: 5,507,516
[45] Date of Patent: Apr. 16, 1996

[54] VEHICLE SUSPENSION

[75] Inventor: John B. Reast, Bedford, United Kingdom

[73] Assignee: Detroit Steel Products, Inc., Morristown, Ind.

[21] Appl. No.: 162,204

[22] PCT Filed: Jun. 10, 1992

[86] PCT No.: PCT/GB92/01039

§ 371 Date: Dec. 7, 1993

§ 102(e) Date: Dec. 7, 1993

[87] PCT Pub. No.: WO92/22438

PCT Pub. Date: Dec. 23, 1992

[30] Foreign Application Priority Data

Jun. 10, 1991 [GB] United Kingdom ............... 9112461

[51] Int. Cl.[6] .................................................. B60G 11/44
[52] U.S. Cl. ................... 280/689; 280/718; 280/720; 267/260; 267/263; 267/231; 267/232
[58] Field of Search .................................. 280/689, 718, 280/720, 717, 723, 688; 267/260, 263, 265, 231, 232, 234, 247, 25, 28, 29

[56] References Cited

U.S. PATENT DOCUMENTS

| 1,378,665 | 5/1921 | Du Ford | 267/29 |
|---|---|---|---|
| 2,582,775 | 1/1952 | Giacosa . | |
| 3,137,488 | 6/1964 | Toyer | 280/718 |
| 3,491,994 | 1/1970 | Reynolds | 280/718 |
| 3,860,259 | 1/1975 | Allison | 280/720 |
| 4,181,324 | 1/1980 | Hixon . | |
| 4,621,834 | 11/1986 | Aubry et al. | 280/718 |
| 5,007,660 | 4/1991 | Orndorff, Jr. et al. | 267/25 |

FOREIGN PATENT DOCUMENTS

| 458385 | 10/1913 | France . | |
|---|---|---|---|
| 1362660 | 4/1964 | France | 267/25 |
| 1136383 | 5/1967 | France . | |
| 1012533 | 7/1957 | Germany | 267/25 |
| WO90/11201 | 10/1990 | WIPO . | |
| WO90/13450 | 11/1990 | WIPO . | |

Primary Examiner—Karin L. Tyson
Attorney, Agent, or Firm—William Lloyd Clayborn; John M. Cone

[57] ABSTRACT

A vehicle suspension system, comprising suspension means, anti-roll means capable of rotational movement due to deflection of the suspension means during straight axle static bounce motion thereof, and counteracting means arranged to act between said anti-roll means and the vehicle frame or chassis during straight axle static bounce motion of the suspension means, to at least partially counteract any consequential rotational movement of the anti-roll means, thereby applying a couple or moment to, and as a result, altering the deflection and rate of said suspension means.

16 Claims, 6 Drawing Sheets

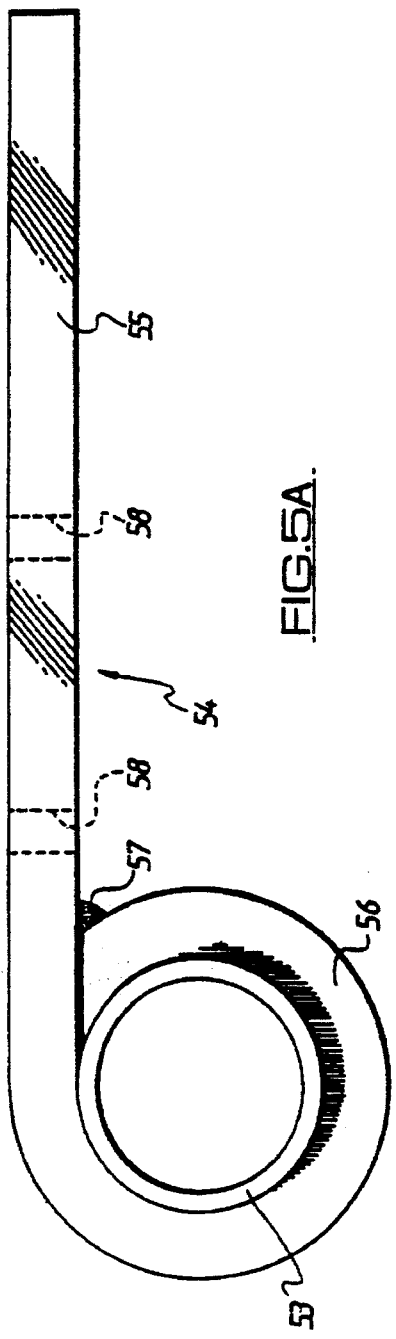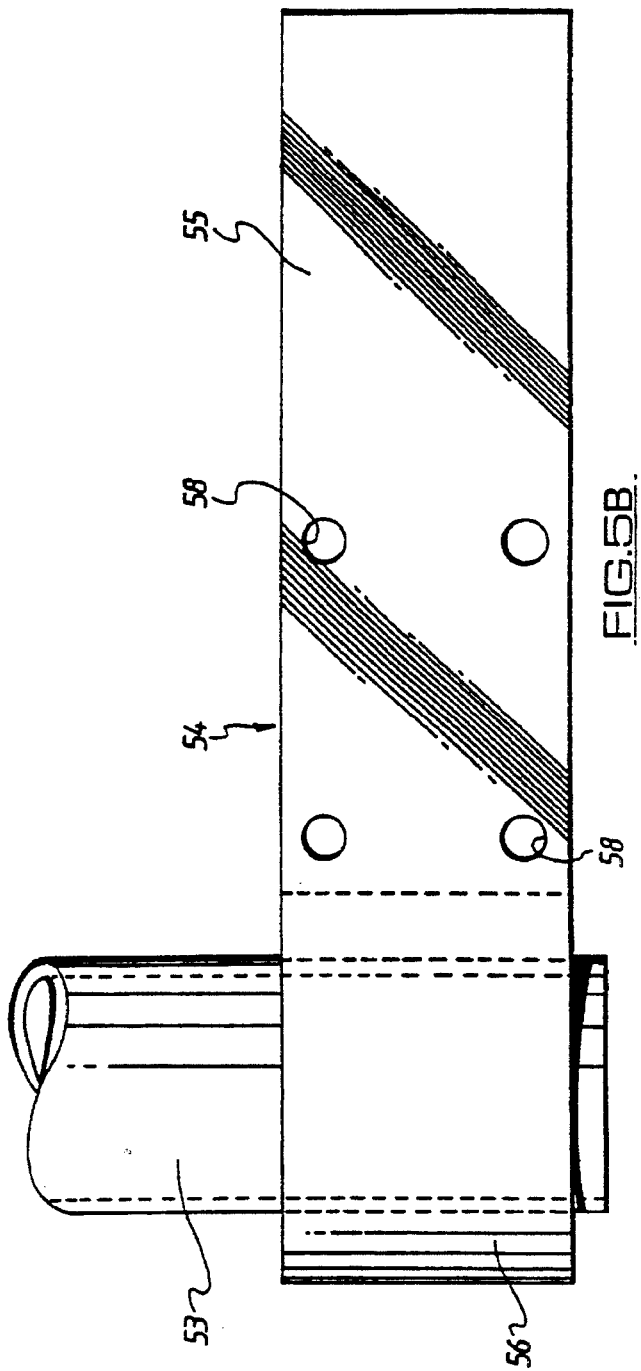

VEHICLE SUSPENSION

BACKGROUND OF INVENTION

This invention relates to vehicle suspensions and especially, but not exclusively, to suspensions for heavy load-carrying vehicles, such as, trucks and other similar types of commercial vehicle.

In a known type of vehicle suspension, such as that disclosed and claimed in our co-pending International Patent Application No. PCT/GB90/00436 (Publication No. WO 90/1121) entitled "Vehicle Suspension System", stabilizing means in the form of an anti-roll device, such as, an anti-roll tube or bar, is fastened transversely of a vehicle between the springs on opposed sides thereof, to provide the vehicle with an anti-roll characteristic.

Such a transversely arranged anti-roll device neither bears nor creates any force when the vehicle suspension is undergoing so-called "straight axle, static bounce" motion, because the respective springs on opposed sides of the vehicle deflect by substantially the same amount and in the same direction. In this manner, the components by which the anti-roll device is attached to the associated springs and the device itself are rotatably deflected by substantially the same amount.

During rolling motion of the vehicle, however, the springs on each side of the vehicle deflect in different directions, such that the components by which the anti-roll device is attached to the springs, attempt to rotate in different directions, thereby twisting along the length of the transverse anti-roll device. Resistance to this torsional strain creates, in turn, a moment in the springs thereby stiffening-up their opposing movements during vehicle roll. Thus, the springs are effectively stiffer during vehicle rolling motion than in straight axle, static bounce motion, due to this anti-roll effect.

Such anti-roll means may also carry secondary suspension means in series or parallel with the suspension springs which effectively constitute primary suspension means, with the secondary suspension means softening the total rate of the overall suspension. Such secondary suspension means may be in any suitable form, such as, leaf springs or air or elastomeric cushions, and can be positioned at various locations transversely of the vehicle. Such locations for the secondary suspension means may be in-line with the springs of the primary suspension means or outboard or inboard thereof. The inboard secondary suspension means may also be combined into a single unit, such as, a spring.

Accordingly, it is an object of the presently inventive suspension to improve the operating characteristics of known suspensions of not only the type described above but also any other suspension system including other forms of transverse anti-roll means subject to rotation during straight axle, static bounce motion of the vehicle.

Another object of the present invention is to increase the spring rate of a suspension proportional to increased suspension spring deflection during straight axle, static bounce motion, thereby enabling the vehicle to carry heavier loads than previously.

A further object of the invention is to reduce peak stresses in the leaves of a suspension spring, thus enabling the spring to carry a higher load without being overstressed.

Yet a further object of the invention is to utilise the anti-roll device to achieve one or more of the above-mentioned objects of the inventive suspension.

SUMMARY OF THE INVENTION

Accordingly, the present invention resides in a vehicle suspension comprising suspension means and anti-roll means capable of rotational movement due to deflection of said suspension means during straight axle static bounce motion thereof, including means arranged to act between said anti-roll means and the frame or chassis of the associated vehicle during straight axle static bounce motion of said suspension means, to at least partially counteract any consequential rotational movement of said anti-roll means, thereby applying a couple or moment to, and, as a result, altering the deflection and rate of, said suspension means.

Such alteration of the deflection and rate of the suspension means may be to stiffen the vehicle suspension or to effectively soften it.

The counteracting means may be a positive stop to any rotation of the anti-roll means which is preferably arranged transversely of the longitudinal axis of the vehicle. Alternatively, such a counteracting force may be graduated to provide a gradually increasing force which may eventually terminate in such a positive stop. Thus, when the anti-roll means undergoes rotation due to straight axle deflection of the suspension means, such rotation is at least partially counteracted, thereby creating a couple in the associated suspension means to effectively stiffen the latter.

The rotation counteracting means may be associated directly with, say, a transverse bar or tube of the anti-roll means or, alternatively, with any associated bracketry or other associated components of such means.

Also, the counteracting means may be arranged to act directly between the anti-roll means and the frame or chassis of the vehicle or to act indirectly therebetween, for example, via another suspension component, such as, a mainleaf spring, connected to the vehicle frame or chassis.

When the suspension means comprises leaf springs on opposed sides of the associated vehicle, the primary gain afforded by the inventive suspension would be an increase in spring rate with increased spring leaf deflection obtainable in straight axle, static bounce deflections.

Also, because the leaf springs or other suspension means are effectively stiffer, the suspension can carry heavier loads than previously.

Additionally, because the resistance to rotation of the anti-roll means creates a couple or moment in, say, leaf springs of the suspension means, thereby stiffening the springs, the suspension is effectively higher rated for carrying heavier loads. An additional feature of this arrangement, namely, by at least partially counteracting the bending moment on the springs, is that the peak stresses in the leaves of the springs can be reduced, thus enabling the springs to carry greater loads without being overstressed.

The counteracting resistance to any rotational movement which the anti-roll means undergoes during straight axle static bounce, may be of any suitable form, such as, spring means comprising a helical spring or air spring, to provide a gradually increasing resistance to counteract such rotation, optionally terminating eventually in a positive stop. In such an air spring arrangement which could be inflated, deflated or reversed, the associated vehicle could be raised or lowered as a result of the changed rate of the associated suspension springs. For instance, if reversed when the suspension means is lightly loaded, this arrangement could be used to deflect any associated suspension springs to lower the vehicle, thereby aiding vehicle loading or coupling to a trailer.

Alternatively, the counteracting resistance may provide a rigid stop between the component, such as, a resistance arm of the type described below, connected to the anti-roll means and the vehicle frame or chassis.

In a preferred embodiment, the anti-roll means is connected transversely of the associated vehicle to leaf springs on opposed sides thereof, with the rotation counteracting means, being in the form of an arm or other suitable component secured thereto and arranged to act against spring means associated with the vehicle chassis or frame. The resistance arm may be attached to the anti-roll means, preferably in the form of an anti-roll bar or tube, or, the transverse, anti-roll bar or tube may be shaped to constitute the arm, as will be described in more detail hereinbelow.

Again, the counteracting means may comprise spring means, as described above, or a damper, hydraulic cylinder or other suitable device. One alternative could be for such means to be activated or controlled by an active or semi-active ride system. Another might be to use a resiliently flexible arm of sufficient stiffness to at least partially counteract rotation of the anti-roll means.

Preferably, the suspension means comprises a leaf spring, such as, a semi-elliptical leaf spring, which in several embodiments, constitute at least part of the main vehicle suspension.

In this manner, and in accordance with all embodiments of the presently inventive suspension, such counteracting means acts directly or indirectly between the anti-roll means and the vehicle chassis or frame, to effectively stiffen the suspension means as a result of the consequential restoring couple or moment applied thereto.

In one embodiment of the inventive suspension, the counteracting means may be provided in the form of a preformed, unitary component, particularly when in the form of a resistance arm, which can be supplied as a so-called "add-on" for incorporation in an existing suspension.

BRIEF DESCRIPTION OF THE DRAWINGS

In order that the invention may be more fully understood, preferred embodiments in accordance therewith will now be described by way of example and with reference to the accompanying drawings in which:

FIGS. 5A and 5B are respective side elevational and top plan views of an anti-roll tube/resistance arm unit for use in a fifth embodiment of vehicle suspension;

DETAILED DESCRIPTION

As used in this description and the appended claims, the word "directly" means that there are no intervening parts capable of modifying the forces transmitted between the elements or components listed after the word "directly." As used in this description and the appended claims, the word "indirectly" means that there is at least one intervening part capable of modifying the forces transmitted between the elements or components listed after the word "indirectly."

Figure 1A:
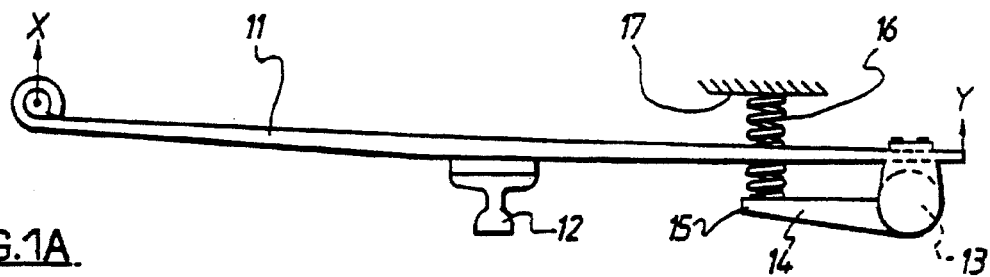
FIGS. 1A and 1B are respective diagrammatic, side elevational and top plan views of a first embodiment of suspension.
Figure 1B:
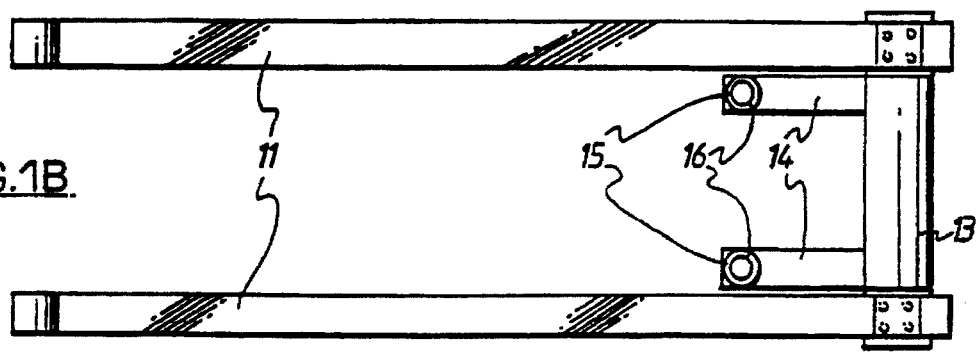

Referring firstly to FIGS. 1A and 1B of the drawings, a suspension for a vehicle wheel set (not shown) comprises a pair of leaf springs 11 which are mounted at 12 on the axle of an associated vehicle on opposed sides thereof and which are secured at front and rear ends thereof to the vehicle frame or chassis at X and Y by any suitable means.

Anti-roll means in the form of an anti-roll device, here shown as a torsion bar or tube 13, has its ends connected rigidly to respective ends of the leaf springs 11. Secured to the anti-roll bar or tube 13 is a pair of forwardly-extending arms 14 upon whose forward ends 15 are supported respective helical springs 16 attached to the vehicle frame or chassis 17.

The arms 14 are secured rigidly to the anti-roll bar or tube 13 such that when the latter rotates during straight axle, static bounce of the vehicle suspension, consequential vertical movement of the arms 14 is resisted, thereby at least partially counteracting such rotation of the anti-roll bar or tube 13. As a consequence, this counteracting resistance to rotation of the anti-roll bar or tube 13 creates a couple or moment in the associated leaf springs 11, thereby effectively stiffening that spring.

In this particular case, the resistance arms 14 and associated springs 16 act directly between the anti-roll bar or tube 13 and the vehicle frame or chassis 17 and the counteracting resistance is graduated until on maximum vertical deflection of the arm 14, a positive stop is reached. However, such graduated resistance may be replaced by a discrete, positive stop at a predetermined vertical level of the arm 14.

In this first embodiment of suspension in accordance with the invention, the leaf springs 11 are rendered effectively stiffer, or more highly rated, when carrying heavier loads. An additional feature of this effective couple or moment on the leaf springs 11 is that peak stresses in the leaves thereof can be reduced, thus enabling the springs to carry higher loads without being overstressed.

The location of the sprung resistance arms 14 can be at any suitable location along the anti-roll bar or tube 13 and at any suitable angle thereto, depending upon the particular operating conditions of the associated vehicle.

Figure 2A:
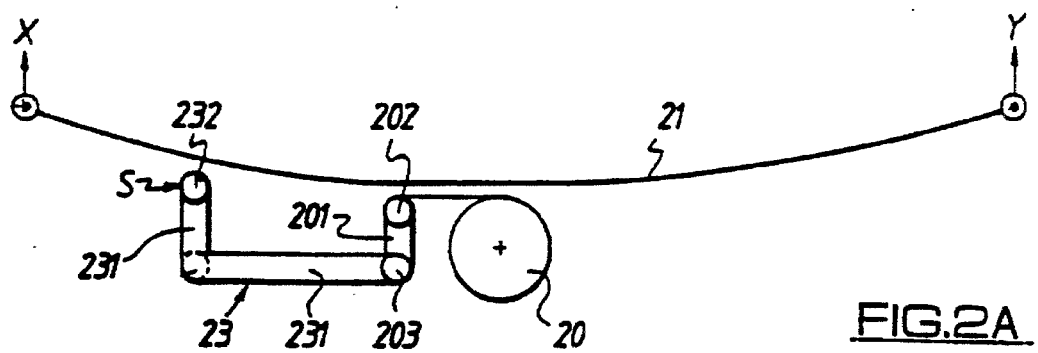
FIGS. 2A and 2B are respective diagrammatic side elevational and front views of a second embodiment of suspension.
Figure 2B:
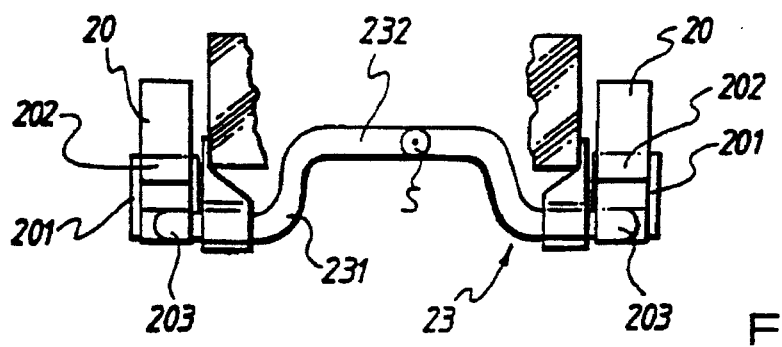

A second embodiment of vehicle suspension is shown diagrammatically in FIGS. 2A and 2B and comprises a fairly conventional form of vehicle anti-roll arrangement, wherein a leaf spring 21 on each side of the associated vehicle is secured at each end to the vehicle frame or chassis at X and Y and generally centrally to an axle 20 to which is secured, via upper and lower bushes 202, 203 constituting a shackle 201, an anti-roll device in the form of a generally U-shaped bar 23. The middle part of this anti-roll bar 23 comprises a pair of forwardly and upwardly extending portions 231 merging into an upper central portions 232, such that it acts directly against the vehicle frame or chassis.

A spring bias, indicated by the arrow S and as shown extending into the plane of the page in FIG. 2B, is applied to the upper central length 232 of the anti-roll bar 23, to provide a resistance for at least partially counteracting rotational movement of the bar during straight axle, static bounce of the vehicle suspension.

As indicated above, a positive resistance stop, as opposed to the graduated resistance provided by the spring bias S, may be used.

The addition of the counteracting resistance means to this conventional anti-roll arrangement enables the vehicle to carry extra weight without overstressing the springs 21, to raise or lower the suspension or to stiffen or soften it.

Figure 3:
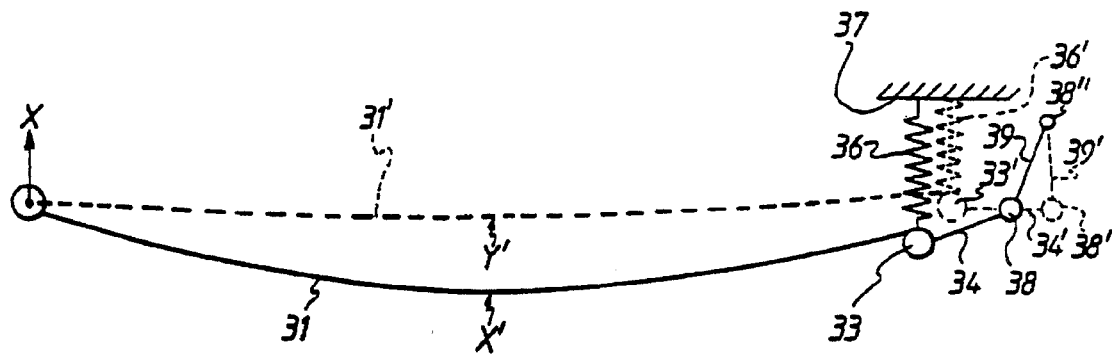
FIG. 3 is a diagrammatic side elevation of a third embodiment of suspension.

Referring now to FIG. 3, a diagrammatic representation of a leaf spring connected to the vehicle frame or chassis at its front end at X, is shown in two operating conditions. The first, under a light load represented by X', has the leaf spring in the configuration shown at 31, with a secondary suspension means in the form of a spring shown in an extended condition 36. The associated arm 34 is equivalent to the arm 14 of the first embodiment of FIGS. 1A and 1B and is secured between anti-roll means in the form of a transverse anti-roll bar or tube 33 and a bush 38 of a shackle indicated at 39. The other end of the shackle 39 is connected to the vehicle frame or chassis by a bush 38" with the shackle acting as a resistance stop to constitute the counteracting means for the anti-roll bar or tube 33, whereby the resistance arm 34 and shackle 39 act directly between the anti-roll bar or tube 33 and vehicle frame or chassis.

Under a heavy load, as represented at Y', the primary suspension leaf spring is deflected upwardly into the condition shown at 31' and the anti-roll bar or tube rotates and moves into the position represented at 33'. Thus, the other end of the arm, as shown at 34', is lowered relative to the spring 31', with the secondary suspension spring secured to the vehicle frame or chassis at 37 being deflected by compression under the increased load, as shown at 36', by a sufficient amount to bring the bush, as shown at 38' of the shackle, now shown at 39', back to where the shackle would have moved under extension of the primary suspension leaf spring end. This particular geometry and deflection of the spring 36, 36' allows deflections in the leaf spring 31, 31' which do not create any resistance to rotation of the anti-roll bar or tube 33, 33' and thus does not create a restoring couple or moment in the leaf spring 31, 31'. If such deflections varied differently under static and dynamic loadings, or other operating conditions, the suspension could be stiffened or softened due to this geometrical match not being effective under some of those conditions.

Figure 4A:
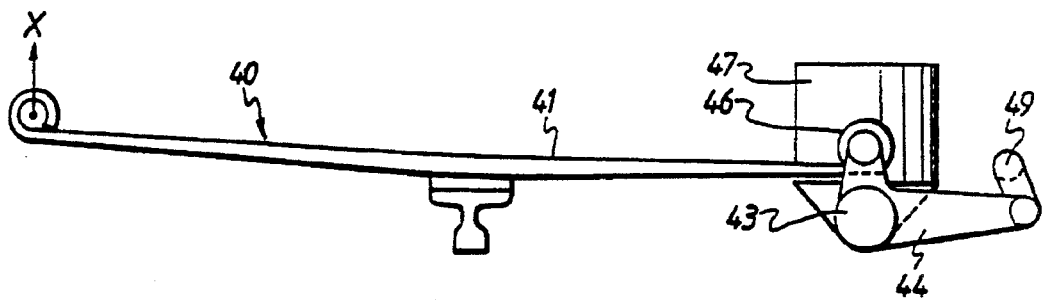
FIGS. 4A and 4B are respective diagrammatic side elevational and front elevational views of a fourth embodiment of vehicle suspension based upon that of FIG. 3.
Figure 4B:
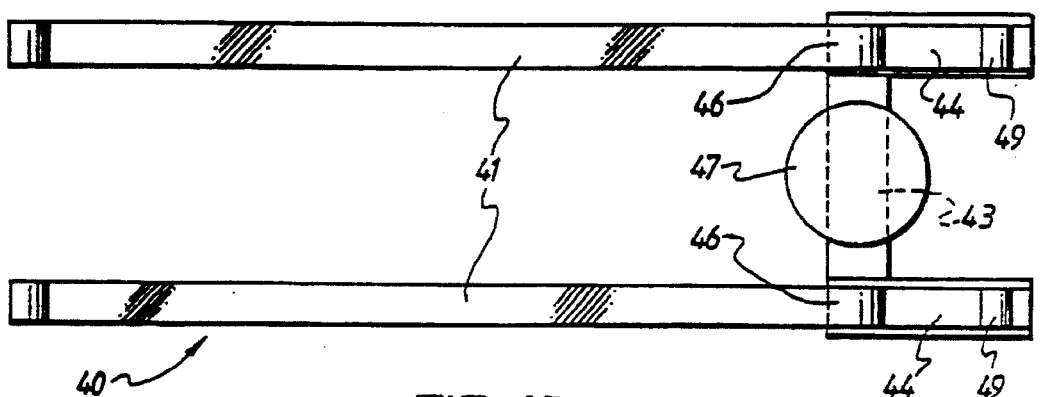

Such an arrangement could be applied to the embodiment shown in FIGS. 4A and 4B, wherein primary suspension means indicated generally at 40 is constituted by a pair of leaf springs 41 disposed on opposed sides of a vehicle chassis (also not shown) and connected thereto at their front ends at X. Opposed ends of an anti-roll bar or tube 43 are connected to respective arms 44 which, at one end, are connected to the vehicle chassis by shackles 49 and, at the other end, directly to the anti-roll bar or tube 43 at 46 at the adjacent end of the leaf springs 41.

Secondary suspension means in the form of, say, a coil spring 47, is mounted upon the anti-roll bar or tube 43 to act in conjunction therewith.

This particular embodiment is a modification of the embodiment described in relation to FIG. 2 of our copending International Patent Application referenced above, with the exception that a bush attachment between the arm 44 and leaf spring 41 at 46 is eliminated, because the arm has to be connected rigidly to the anti-roll tube or bar 43. Thus, the arrangement operates generally in accordance with the embodiment described above in relation to FIG. 3, with the resistance arm 44 and shackle 49 acting directly between the anti-roll bar 43 and vehicle frame or chassis. Stiffening or softening of the suspension can also be achieved in accordance with the embodiment of FIG. 3.

In this arrangement also, the secondary suspension means, provided in this particular case by the coil spring 47, is equivalent to the secondary suspension spring 36, 36' of FIG. 3.

In FIGS. 5A and 5B, there is shown a preformed unitary structure comprising a pair (only one shown) of resistance arms 54 attached to an anti-roll bar tube 53.

Each resistance arm 54 comprises one end, such as generally circular end portion 56, whose inner surface is welded to the outer surface of the anti-roll tube 53 at one end thereof.

The resistance arm 54 also comprises the other end, such as a generally linear arm portion 55, which can be secured to an existing vehicle suspension by means of, for example, bolts passing through respective holes 58.

Extra stiffness for each resistance arm 54 is provided by a weld 57 in the juncture between the end portion 56 and arm portion 55.

Figure 6A:
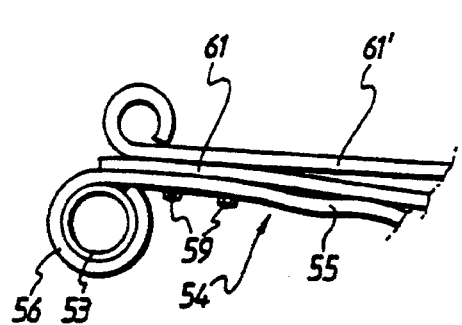
FIGS. 6A and 6B are respective side and rear elevational views of a fifth embodiment of vehicle suspension incorporating the unit of FIGS. 5A and 5B.
Figure 6B:
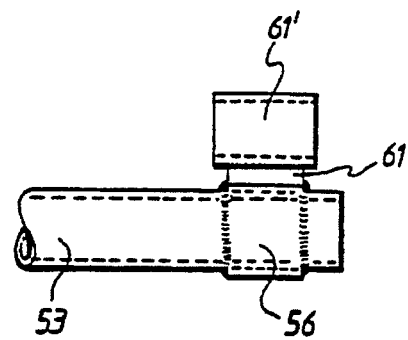

This preformed unit comprising the pair of resistance arms 54 and associated anti-roll tube 53 can be readily secured, as described above, to, say, the leaf springs of an existing vehicle suspension, as shown in FIGS. 6A and 6B. Here, the unit has the generally straight arm portion 55 of the resistance arm 54 secured by bolts 59 to a pair of leaf springs 61, 61' of an existing vehicle suspension.

In this particular arrangement, with the resistance arm 54 acting directly between the anti-roll tube 53 and the existing vehicle suspension leaf springs 61, 61', and hence indirectly between the tube 53 and the frame or chassis (not shown) of the associated vehicle, the resistance to at least partially counteract rotational movement of the anti-roll tube 53 is transferred to the vehicle frame or chassis via the main leaf springs 61, 61'.

These main vehicle suspension leaf spring resistance arms 54 can also increase the stiffness of and reduce stresses in the main springs locally, due to their contact therewith, in addition to any other counteracting means which may be provided. Such other counteracting means may be in the form of those discussed above in relation to the earlier embodiments of the inventive suspensions.

A further feature of this particular arrangement for the resistance arms 54 is that they can reduce the stresses in and increase the spring rate locally of the main leaf springs 61, 61' during rolling motions of the vehicle, by distributing the anti-roll effect from the anti-roll tube over a large[section of the main leaf springs.

Figure 7:
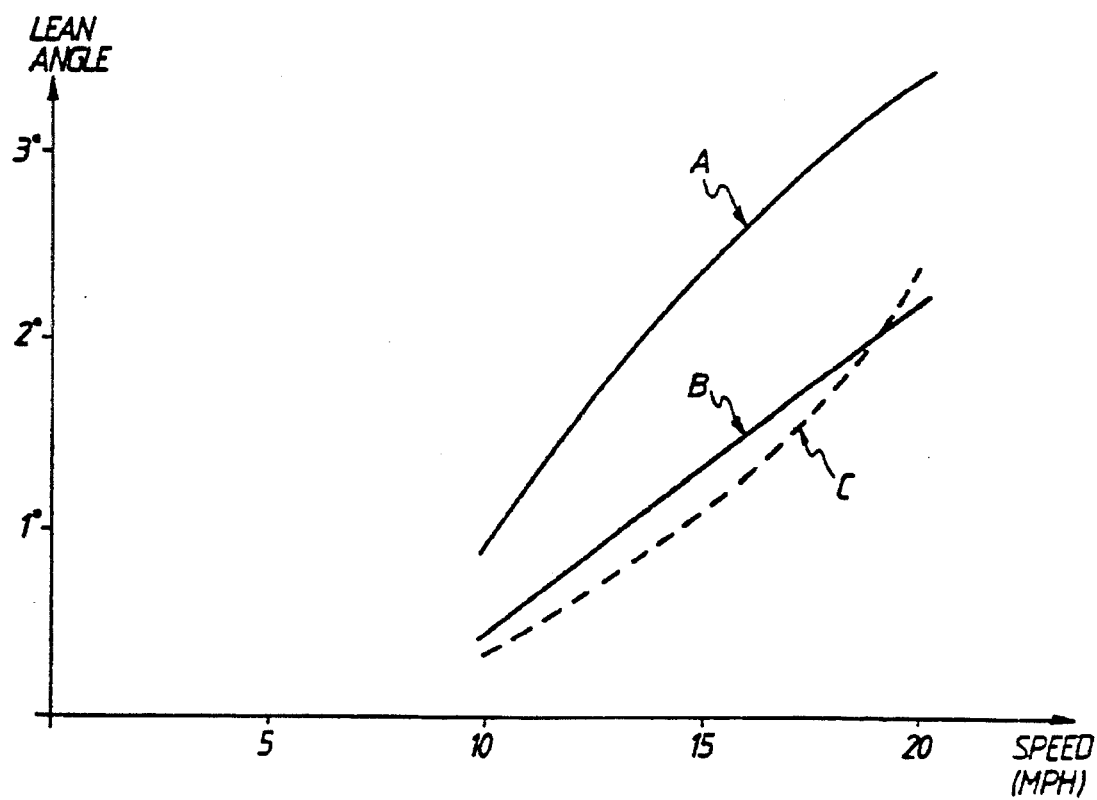
FIG. 7 is a graph of angle of lean versus speed of a vehicle fitted with the suspension shown in FIGS. 6A and 6B.
Figure 8:
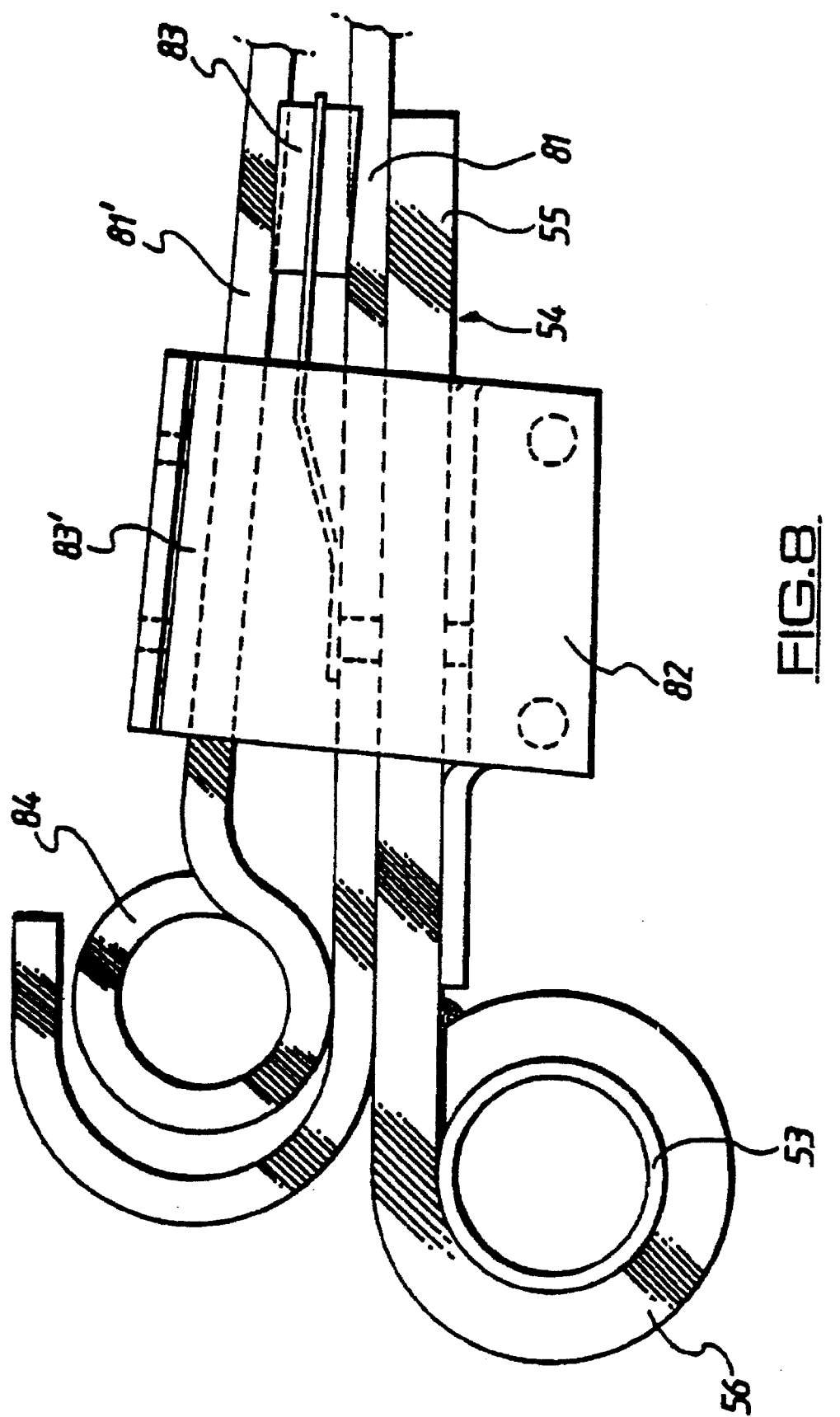
FIG. 8 is a side elevational view of another, sixth embodiment of vehicle suspension incorporating the unit of FIGS. 5A and 5B.
Figure 9A:
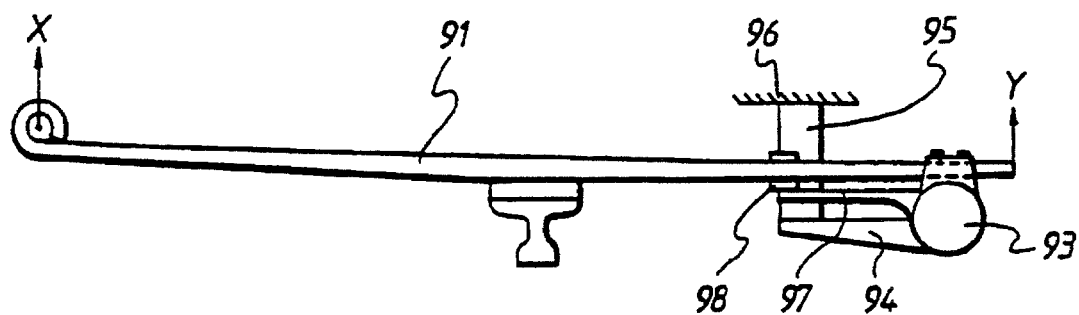
FIGS. 9A and 9B are respective side elevational and top plan views of a seventh embodiment of vehicle suspension.
Figure 9B:
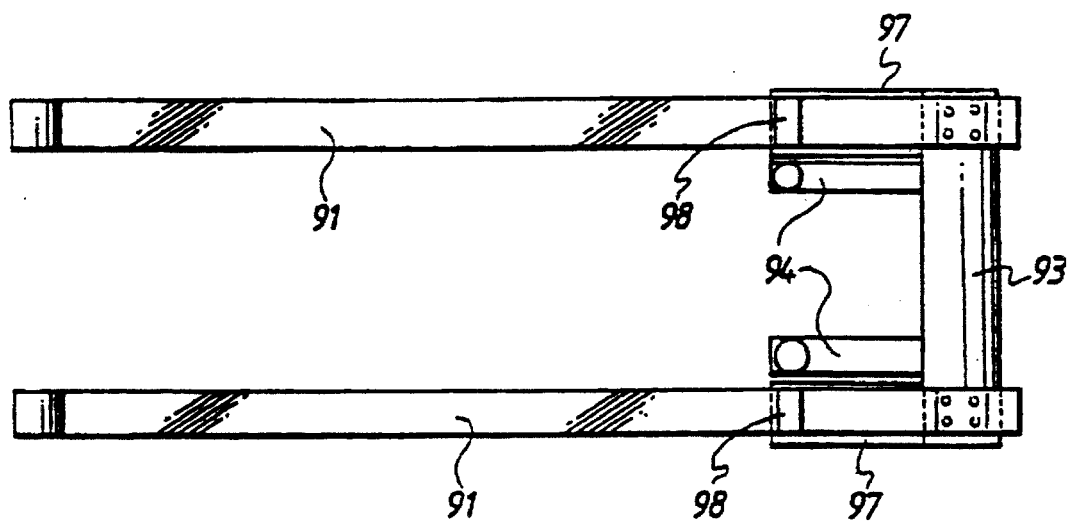

Trials on this particular embodiment of the inventive suspension have been carried out and FIG. 7 is a graph of the results of those trials, representing angle of lean of the vehicle in degrees versus the speed of the vehicle in miles per hour.

In the graph shown in FIG. 7, the three curves can be identified as follows:

A—vehicle fitted with no anti-roll means

B—vehicle fitted with conventional anti-roll means in the form of a torsion bar

C—vehicle fitted with anti-roll tube and resistance arm unit of FIGS. 5A and 5B, incorporated in the existing vehicle suspension, as shown in FIGS. 6A and 6B.

As can be seen from that graph, the vehicle fitted 9B, here a pair of leaf springs 91 arranged on opposed sides of the associated vehicle frame or chassis, are connected to the vehicle frame or chassis at X and Y and are each associated with two forms of resistance arm.

The first resistance arm 94 is secured rigidly at one end to the corresponding end of anti-roll means in the form of an anti-roll bar 93. The other end of each resistance arm 94 is arranged to contact a rigid stop 95 which, in turn, is connected to the vehicle frame or chassis at 96, so that the resistance arm 94 and stop 95 act directly between the anti-roll bar 93 and the vehicle frame or chassis is 96, when the bar 93 has rotated a sufficient amount for the arm 94 to contact the stop 95. Such rotation may be by a predetermined amount, depending upon operating requirements.

The other resistance arm on each side of the vehicle frame or chassis 96 is shown at 97 and it too has one end connected to the anti-roll bar 93. Its other end is connected to the spring 91 by means of a clip and rubber bushes, as shown at 98. This arrangement represents a resilient connection between the forward end of the resistance arm 97 and the leaf spring 91, whereby there is some movement available between the arm 97, clip and rubber bushes 98 and leaf spring 91, whereby the resistance arms 97 and clip and bushes act indirectly, via the springs 91, between the anti-roll bar 93 and vehicle frame or chassis 96.

Thus, this dual arrangement provides a combination of two forms of resistance arm in accordance with the invention.

Indeed, in another embodiment, a purely rigid stop, such as that represented by the stop 95, could be provided between the resistance arm and the vehicle frame or chassis, with the omission of the other resistance arm 97 and associated components 98.

Thus, it can be seen from the embodiments described above in relation to the accompanying drawings that an existing anti-roll means, such as, an anti-roll tube or bar, can be utilised to provide suitable means, to act between the anti-roll means and the vehicle frame or chassis, for at least partially counteracting any rotation of the anti-roll means during straight axle, static bounce motion of a vehicle suspension, in order to apply a restoring couple or moment to the suspension means, thereby stiffening the latter and effectively increasing the spring rate.

Further advantages of the inventive vehicle suspensions, particularly the add-on anti-roll means/resistance arm unit of FIGS. 5A and 5B, include low manufacturing costs, low weight, no requirement for vehicle frame or chassis or suspension mounting bracket modifications, non-specialist manufacture and the removal of stress from the vehicle frame or chassis.

I claim:

1. A vehicle suspension comprising:
   a pair of leaf springs, each leaf spring including mounting means for attachment of the leaf spring to a vehicle;
   an axle attached to said leaf springs;
   anti-roll means extending between and rigidly attached to each of said leaf springs at a point spaced apart from said axle; and
   counteracting means including at least one arm rigidly attached to the anti-roll means, an end of said at least one arm arranged to act directly or indirectly upon the vehicle;
   whereby, when said leaf springs deflect during straight axle bounce motion, said counteracting means acts to at least partially counteract the consequential rotational movement of said anti-roll means, thereby applying a couple or moment to, and, as a result, altering the deflection and rate of, said leaf springs.

2. A vehicle suspension according to claim 1, wherein said counteracting means comprises a positive stop.

3. A vehicle suspension according to claim 1, wherein said counteracting means is graduated to provide a gradually increasing resistance force against rotation of said anti-roll means.

4. A vehicle suspension according to claim 3, wherein said graduated counteracting means terminates in a positive stop.

5. A vehicle suspension according to claim 1, wherein said counteracting means is arranged to act directly between said anti-roll means and the vehicle.

6. A vehicle suspension according to claim 1, wherein said counteracting means is arranged to act indirectly between said anti-roll means and the vehicle.

7. A vehicle suspension system according to claim 6, wherein said counteracting means is arranged to act indirectly between said anti-roll means and the vehicle via another component of the suspension.

8. A vehicle suspension according to claim 7, wherein the other suspension component is a leaf spring connected to the vehicle frame or chassis.

9. A vehicle suspension according to claim 1, wherein an end of the arm is arranged to act directly upon the vehicle by means of spring means arranged therebetween, to provide a gradually increasing force against rotation of said anti-roll means.

10. A vehicle suspension according to claim 9, wherein said spring means terminates in a positive stop.

11. A vehicle suspension according to claim 1, wherein an end of the arm is arranged to engage directly another component of the suspension.

12. A vehicle suspension according to claim 11, wherein the component of the suspension is at least one leaf spring.

13. A vehicle suspension according to claim 1, wherein the arm is resiliently flexible.

14. A vehicle suspension according to claim 1, wherein said anti-roll means and the resistance arm constitute a preformed unit associable with an existing vehicle suspension.

15. A vehicle suspension according to claim 1, wherein said anti-roll means comprises an anti-roll bar or tube arranged transversely of the vehicle frame or chassis and having said counteracting means arranged generally centrally thereof.

16. A vehicle suspension according to claim 1, wherein said anti-roll means comprises an anti-roll bar or tube arranged transversely of the vehicle frame or chassis and having said counteracting means arranged at each end thereof adjacent respective suspension means.

* * * * *